UNITED STATES PATENT OFFICE.

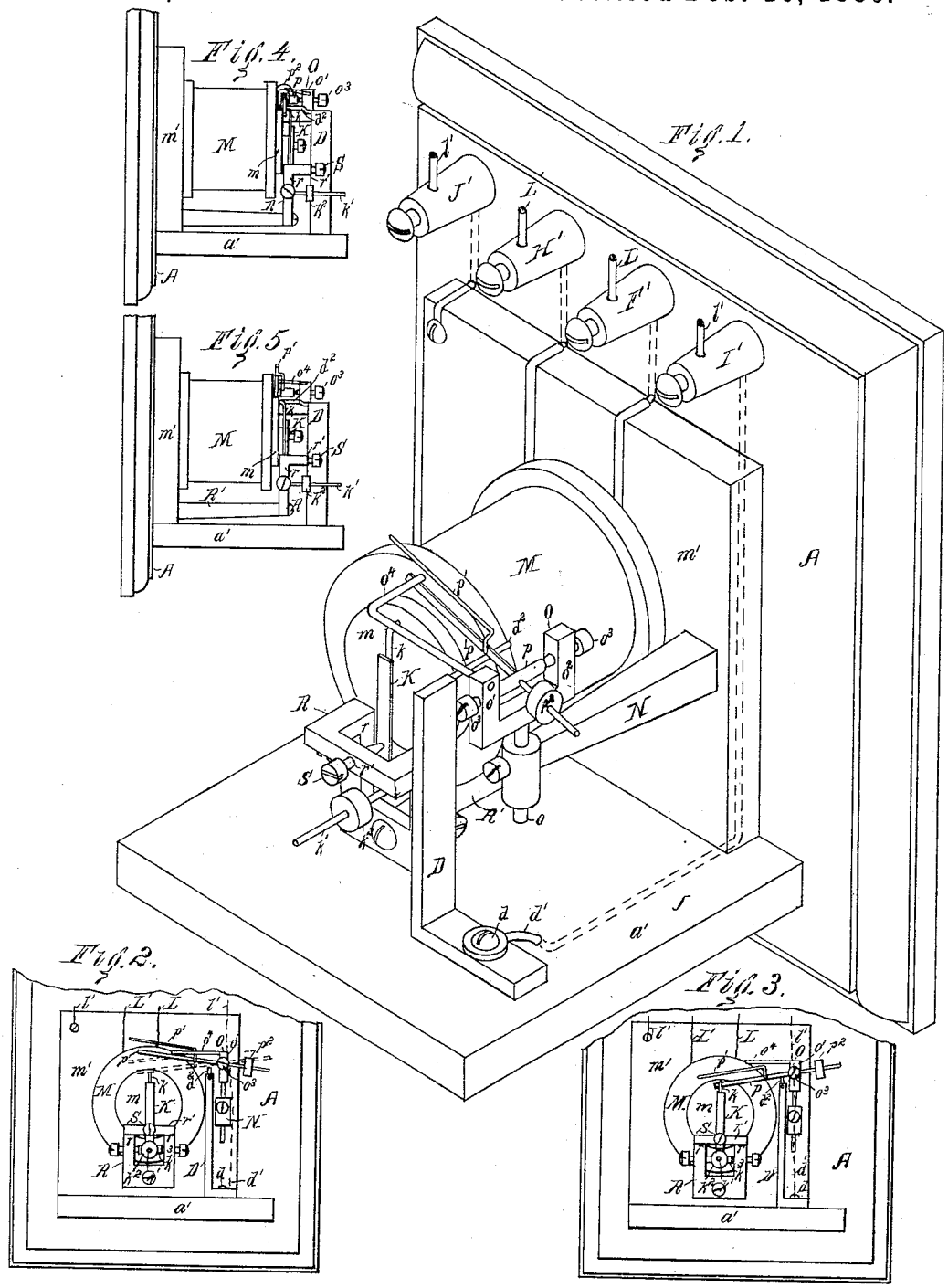

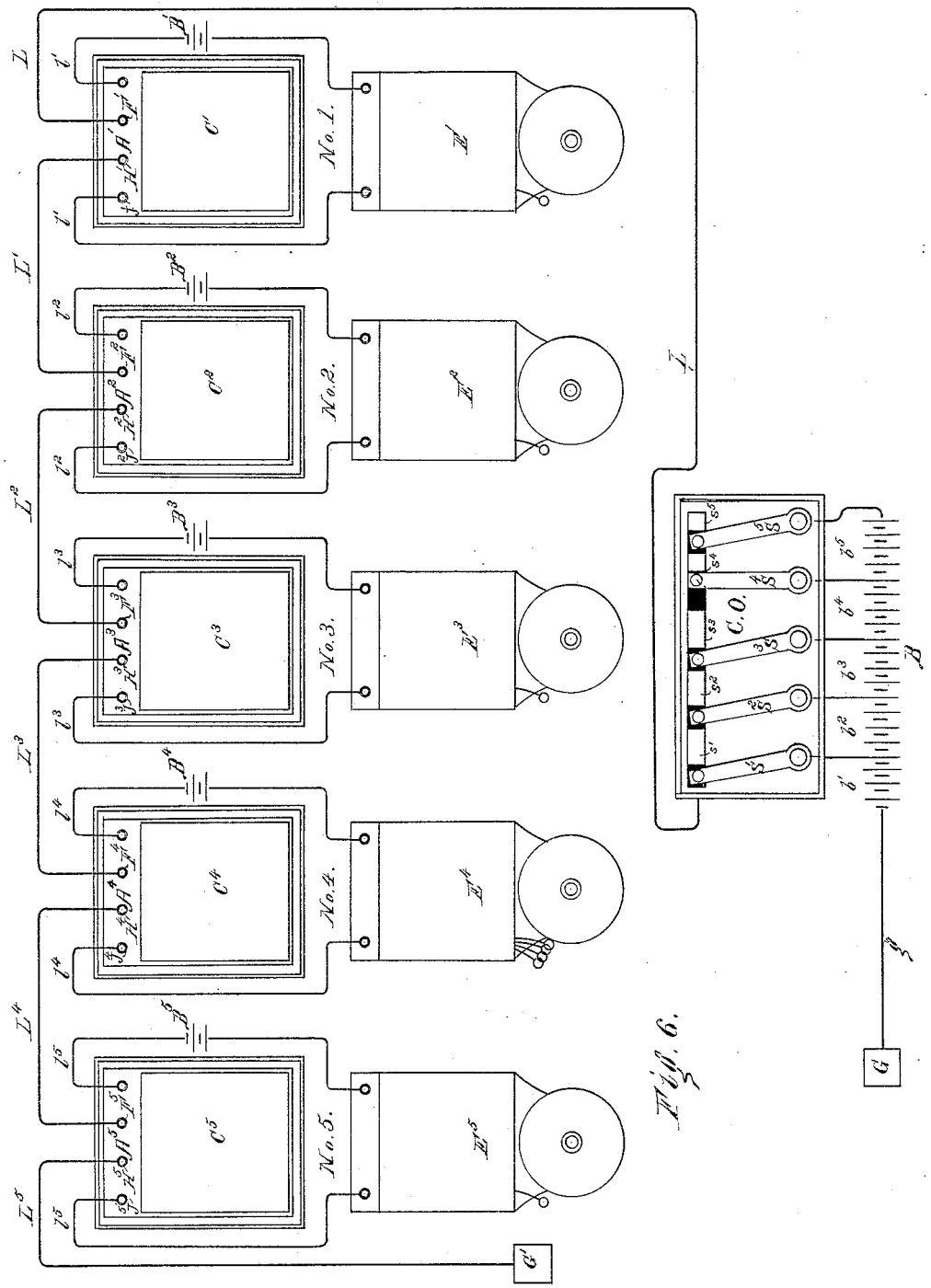

ARTHUR W. S. DAVIS, OF LOWELL, MASSACHUSETTS, ASSIGNOR TO FREDERICK TAYLOR, OF SAME PLACE.

INDIVIDUAL ELECTRIC SIGNAL.

SPECIFICATION forming part of Letters Patent No. 336,095, dated February 16, 1886.

Application filed October 18, 1884. Serial No. 145,829. (No model.)

*To all whom it may concern:*

Be it known that I, ARTHUR W. S. DAVIS, a citizen of the United States, residing at Lowell, in the county of Middlesex and Commonwealth of Massachusetts, have invented a new and useful Improvement in Individual Electric Signals, of which the following is a specification.

My invention relates to improvements in individual signals for use on telephone or telegraph lines; and it consists in the devices, combinations, and construction hereinafter described and claimed.

In the accompanying drawings, Figure 1 is an isometric view of such a signal-instrument attached to its bracket with the cover thereof removed; Fig. 2, a front elevation of the same, except that the upper portion of the wall-plate of the bracket, with the screw-cup, is broken away, the instrument being out of use in these two figures, and the switch being in its normal position, the other position of the switch being indicated by dotted lines in Fig. 2; Fig. 3, the same as Fig. 2, except that the automatic switch is represented only as in a position to send the current to its bell; Fig. 4, a left side elevation of the parts shown in Fig. 3, and with the switch in the same position as in that figure; Fig. 5, the same as Fig. 4, except that the switch is in its normal position; Fig. 6, a diagram showing in elevation five signal-instruments covered, their vibrating or "buzz" bells and local batteries, and showing in plan the central-office switch-board and battery, together with the main and local wires and ground-plates.

The central-office switch-board C O, main battery B, ground-plate G, wire $g$, connecting said plate and battery, switches $S'$ $S^2$ $S^3$ $S^4$ $S^5$, each succeeding switch connecting in the order designated by the letters of reference, adapted to connect additional cells of the battery B to the "line out" L, the switch $S'$ being adapted to connect only a small part of the said battery with the "line out," and the switch $S^5$ being adapted to connect the whole of said battery with the "line out," the vibrating or buzz bells $E'$ $E^2$ $E^3$ $E^4$ $E^5$, meaning thereby to include the bell-hammers and their electro-magnets and armature (not shown) and the boxes which contain said magnets and armatures, and the plate $G'$ at the end of the line, are all of the usual construction and operation, and will be sufficiently understood from the drawings without an extended description thereof.

The signal-instruments are all alike in construction and differ only in the adjustments of their switch-armatures and stop-armatures by means of weights movable thereon, as hereinafter described. For convenience sake, therefore, the following description will relate to the signal-instrument at the first station or outlying station nearest the central office. The bracket, consisting of the wall-plate $A'$ and sole or shelf $a'$, and the cover $C'$, are of the common construction shown, these parts and the other parts of the signal-instruments and the parts connected with them (shown in Fig. 6) being indicated in each instrument in said figure by the same letter, the indices of the letters, however, denoting the relative distances from the central station of the instruments to which said parts respectively belong.

In Figs. 1 to 5 the electro-magnet or helix M has a core provided with enlarged ends, the pole-cheek $m$ or outer one of which ends is enlarged to increase the magnetic field, and the other end or base, $m'$, of which is enlarged still more—say to five or six times the diameter of the pole-cheek—and is secured to the wall-plate $A'$ by screws or any convenient means. Increased size of the base $m'$ has the effect to increase the power of the magnet at the pole-cheek $m$. The screw-cup $F'$ is connected with the line L from the central station and with the helix M, and the screw-cup $H'$ is connected with said helix and with the screw-cup $F^2$ of the signal-instrument at the next sub-station. Secured to the shelf $a'$ by the screw $d$ is a vertical metallic post, D, which is connected by the wire $d'$ to the screw-cup $I'$, the latter being connected through the wire $l'$ and local battery $B'$ to the electro-magnet of the bell $E'$, the last-named magnet being connected through the screw-cup $J'$ to the base $m'$. The post D is provided with a horizontal backwardly-extending metallic arm, $d^2$. A horizontal metallic stud, N, projects forward from the base $m'$ and supports a metallic fork, O, the vertical shank $o$ of which is passed through a hole in the outer end of said stud N, said fork being held therein at any desired height by a set-screw, $n$, which turns in a threaded hole in said stud N and thrusts against said shank $o$. Turning in the tines $o'$ $o^2$ are pivot-screws $o^3 o^3$, between which is supported a shaft, $p$, the points of the pivot-screws entering holes in the ends of said shaft in an obvious manner. Through the shaft $p$, at right angles thereto, is a metallic lever or switch-armature, P, the end of which nearest the magnet is provided with a branch or side arm, $p'$, for a purpose to be explained, and the other or outer end of which is screw-threaded and provided with a threaded weight, $p^2$, which turns on said threaded end, and is thereby adjusted nearer to or farther from the shaft $p$ or fulcrum of said switch-armature. The weight $p^2$ normally throws the inner end of the said switch-armature upward until the main part of said inner end strikes a stop-arm, $o^4$, which projects from the tine $o'$ and is bent across the path of said inner end above the same. The branch or side arm, $p'$, of the switch-armature P is metallic, and being offset for a short distance from the inner arm of said armature P runs parallel with and little above it, over the top of the pole-cheek $m$, while the main portion of the inner arm is a little in front of said pole-cheek. The object of the branch is to increase the surface exposed to the action of the magnet M, and thereby make the switch-armature more sensitive to the attraction of the magnet. When the magnet M draws the inner end of the armature P down, the latter comes in contact with the arm $d^2$ of the post D and closes the circuit from the local battery B' through the electro-magnet of the bell E', screw-cup J', base $m'$, stud N, fork O, switch-armature P, arm $d^2$, post D, cup I', and to said local battery, ringing, of course, the bell E'; but the armature P will not always come in contact with the arm $d^2$ when attracted by the magnet M. There is a stop-armature, K, the same being a bell-crank lever, the vertical arm $k$ of which is attracted by the magnet M, the horizontal arm $k'$ of which is screw-threaded, and on said arm turns a threaded weight, $k^2$, which by so turning is adjusted nearer to or farther from the fulcrum of said stop-armature K, to make said stop-armature more or less readily responsive to slight attractions of the magnet M. The stop-armature K at its bend is secured to a horizontal shaft, $k^3$, which is supported by pivot-screws Q Q, turning in the tines $r$ $r$ of the fork R, substantially as the switch-armature is supported and pivoted, as above described. The fork R is supported upon a stud, R', projecting from the base $m'$, or in any convenient manner. The forward motion of the stop-armature K—that is, its motion away from the magnet M—is limited in the usual manner by a regulating-screw, S, which turns in the bar $r'$, connecting the tines of said fork R. Now, the switch-armature P is so adjusted as to be moved by a much slighter force than is sufficient to move the stop-armature K of the same instrument, so that when the smallest section, $b'$, of the battery B is connected with the line, by moving the switch S' onto the contact-spot $s'$ the switch-armature is attracted down and closes the circuit and rings the bell E'; but when two sections of the battery B are connected with the line the current sent to the magnet is so great that the stop-armature is attracted, and being much nearer to the pole-cheek $m$ than the switch-armature its vertical arm is drawn into the path of the switch-armature, which strikes upon the top of said stop-armature, and is thereby held out of contact with the arm $d^2$, so that the local circuit through the bell E' remains open and the bell does not ring. Now, the switch-armature of each instrument after the first is so adjusted that it will be affected by its magnet whenever there is a sufficient current to operate the stop-armature of the instrument next nearest the central station, so that if it is desired to call sub-station No. 2 two sections, $b' b^2$, of the battery B are thrown into the line by moving the switch $S^2$ onto contact-stop $s^2$, and the current is sufficient to cause the first magnet M to draw the stop-armature under the first switch-armature, as above described, and at the same time to bring down the switch-armature of the second signal-instrument and to close the local circuit through the bell $E^2$ and ring said last-named bell without affecting the switch-armatures or stop-armatures of any signal-instruments farther from the central station than sub-station No. 2. In the same way, by closing the switch $S^5$ and throwing the whole battery into line, the stop-armatures in the first four instruments will hold the switch-armatures of those four instruments from closing the local or bell circuits, and the switch-armature at sub-station No. 5 will fall, closing the local circuit at the sub-station last named and ring the bell $E^5$. The last instrument on the line of course needs no stop-armature.

In Fig. 6 the signal at sub-station No. 4 is represented as being rung, the switch $S^4$ being turned onto its contact-spot $s^4$.

I claim as my invention—

1. The combination of an electro-magnet, a local battery, a signal-bell apparatus in electrical connection therewith, and a switch-armature adapted to be operated by said magnet to close said local signal-circuit, and a stop-armature placed nearer to the pole-cheek of said magnet and adapted to be operated only by a greater current than is necessary to operate said switch-armature, and arranged to swing in a plane at right angles to the plane in which said switch-armature moves, so as, when operated, to be swung in the path of said switch-armature and between said switch-armature and said pole-cheek, and to arrest the motion of the same and to prevent the closing of said local circuit, as and for the purpose specified.

2. The combination of the main line and battery, an electro-magnet in said line, a signal-bell apparatus included in a local line, said local line having at one end a metallic post provided with a metallic arm and having at the other end a pivoted switch-armature adapted to be brought by the attraction of said magnet into contact with said arm of said post, and a stop-armature adapted by the attraction of said magnet to be brought into the path of said switch-armature and to arrest the motion thereof, said armatures being each provided with an adjustable weight, whereby said armatures may be so adjusted relatively to each other that a slighter current will operate said switch-armature than is required to operate said stop-armature, and means, substantially as described, whereby a greater or less portion of said battery may at will be thrown into the main line, as and for the purpose specified.

3. In an electric signaling system, the combination of a main line, a main battery, a series of switches arranged to throw successively greater portions of said battery into the main line, with a series of signaling-instruments, each consisting, substantially, of an electromagnet in the main line, a local circuit including a signal-bell apparatus and a local battery and ending in a metallic post, and a switch-armature adapted by the attraction of said magnet to close said local circuit by contact with said post, a stop-armature adapted by the attraction of said magnet to swing into the path of said switch-armature and to prevent the closing of said local circuit, said armatures being pivoted and provided with adjustable weights, and being so arranged and adjusted that the switch-armature of each signaling-instrument will be operated by a smaller portion of said battery than the stop-armature of the same instrument, and so that a portion of the battery sufficient to operate any stop-armature will be sufficient to operate the switch-armature of the instrument next farther from said main battery, all as and for the purpose specified.

ARTHUR W. S. DAVIS.

Witnesses:
  ALBERT M. MOORE,
  HERBERT R. WHITE.